June 8, 1948.   D. W. HOPKINS   2,443,036
VALVE

Filed May 4, 1944   2 Sheets-Sheet 1

Inventor:
David W. Hopkins,
By Barr, Borden & Fox
Attorney.

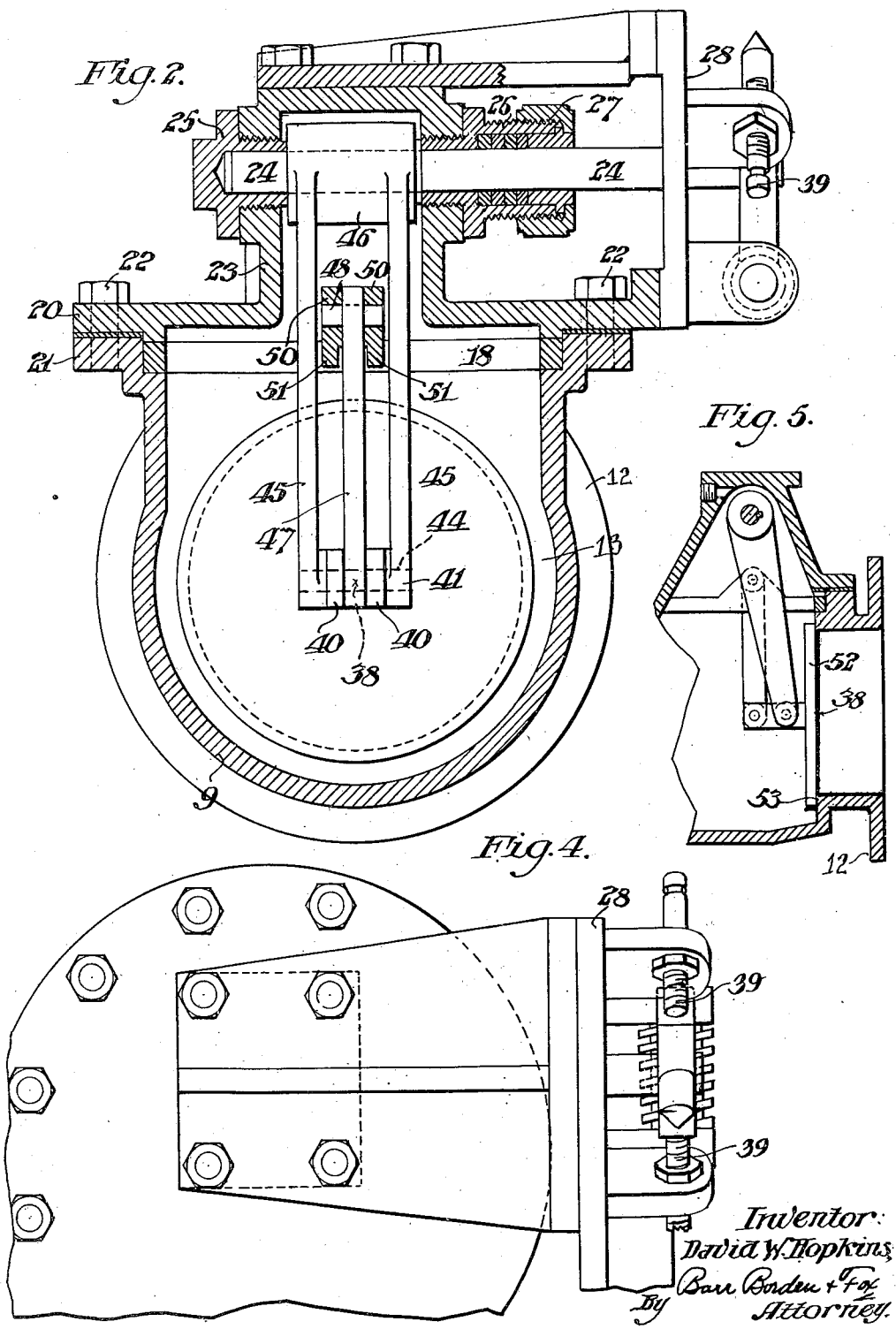

Patented June 8, 1948

2,443,036

UNITED STATES PATENT OFFICE 2,443,036

VALVE

David W. Hopkins, Philadelphia, Pa.

Application May 4, 1944, Serial No. 534,057

7 Claims. (Cl. 251—16)

This invention relates to valves and pertains particularly to valves for both shut-off and flow regulation functioning.

Many efforts have been made in the past to create a valve having a sealing disc capable alternately of seating on a valve seat or of disposition within the valve casing at approximately 90° to the valve seat, so as to facilitate free flow through the valve. In every case with which applicant is familiar there is either difficulty in seating for shut-off purposes without inordinate leakage, or there is such frictional effects on the flow as to so reduce the efficiency of the valve as to minimize its usefulness, or it was incapable of regulation of the flow with the valve cracked, or it combined all or some of these major disadvantages. Of course minor disadvantages also arose from chatter and vibration due to existence of too many pivots and because of wear thereof, angular approach of the valve disc to the valve seat instead of a parallel approach, the power requirements were too high, too much metal was required on the valves, the valves were too large for the capacities thereof, and so on.

It is among the objects of this invention to obviate the disadvantages of the prior art; to provide a valve by which both shut-off and regulations can be attained with efficiency; to provide a valve having both face to face sealing as well as a vane disposition at approximately 90° to the valve; to provide a valve mechanism by which the center of the valve disc moving between sealing closure on a valve seat transverse of the flow passage to a position substantially parallel with the flow in the flow passage travels on practically a linear path centrally of the valve flow passage; to provide a valve disc with linkage and an actuating lever by which the valve has a small amount of practically axial motion parallel to the seat for sealing purposes, or for unsealing purposes prior to swinging to an angle divergent from the seated planar disposition; and many other objects and advantages will become more apparent as the description proceeds.

In the accompanying drawings forming part of the description

Fig. 2 represents a transverse section therethrough on lines 2—2 of Fig. 1;

Fig. 4 represents a fragmentary plan view of the valve of Fig. 1, and

Fig. 5 represents a fragmentary longitudinal section through a modified form of valve according to the invention.

Figure 1:
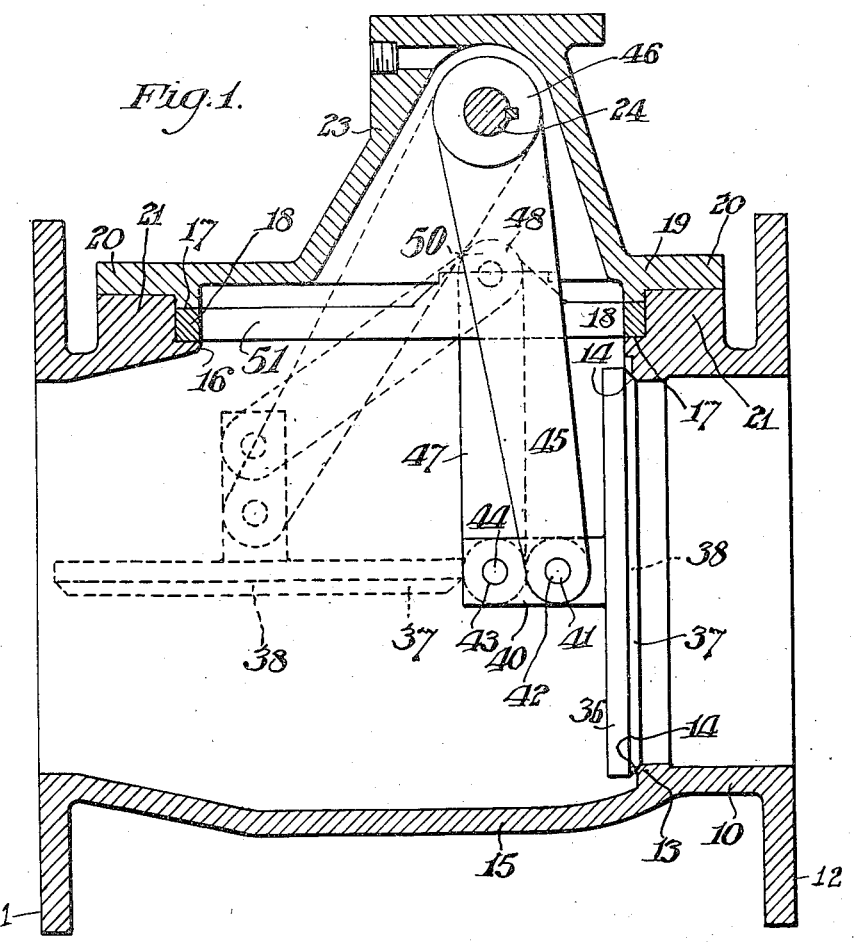
Fig. 1 represents a longitudinal section through a form of valve according to this invention.
Figure 3:
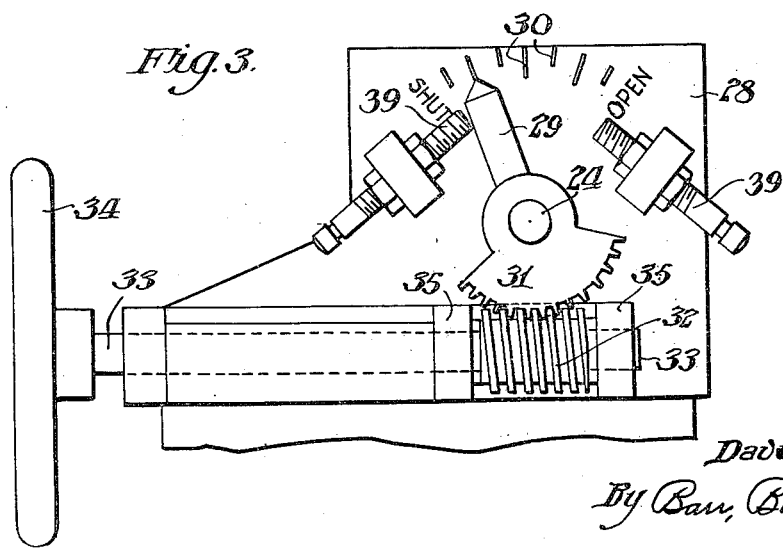
Fig. 3 represents a fragmentary end elevation of the valve of Fig. 1.

In the drawings there is disclosed a valve housing 10 having an attaching annular flange 11 at one end concentric with the flow axis of the housing, and having a similar attaching annular flange 12 at the other end, so that the valve housing can be inserted in a pipe line in accordance with the usual practice. The valve housing 10 is formed toward one end adjacent to the attaching flange 12, with a valve seat 13 which is preferably slightly bevelled as shown in Fig. 1, as at 14. Preferably the valve housing is slightly bulbous between the valve seat 13 and the end flange 11 as shown at 15, although the enlargement is very gradual so that the energy-destroying bulbosity of the typical globe valve for instance is avoided. If desired, by slightly increasing the seat area for instance, or otherwise, it will be found unnecessary to appreciably or even actually enlarge the valve housing. As suggested however, the slight enlargement shown is preferred and is so gradual that no undue turbulence is created so that the pressure drop across the valve is inappreciable. The housing 10 is transversely substantially cylindrical through a semi-circumference as shown at 9 in Fig. 2, endwise between the complete annular end flanges 11 and 12, which merges into an annular manhole opening 16 having spider receiving seat 17 upon which an annular spider 18 is mounted having transverse webs to be described, for anchoring engagement by a housing enlargement 19. The housing enlargement 19 has a flange 20 arranged for juxtaposition relative to a complemental flange 21 surrounding the man-hole 16, so that the housing enlargement can be held in sealed relation on the valve housing 10 by suitable means, such illustratively as by bolts 22 passing through complemental flanges 20 and 21.

The housing 19 has an asymmetrical protuberance 23 disposed eccentrically of the flange 20 forming a lever end receiving and shaft mounting portion in which the lever actuating shaft 24 is mounted extending transversely of the valve and power housing. Lever 24 has one end disposed in a threaded bushing 25 removably mounted at one side of the housing enlargement protuberance 23 and on the other torque-applying side thereof it passes successively through the threaded bushing 26 and stuffing box 27, then through a worm gear-supporting plate 28 lying in a plane parallel to the axis of the valve. The plate 28 may carry indicia 30 and is arranged to be overlain by a segmental gear 31 keyed to the shaft 24, the pointer end 29 of which moves angularly relative to the indicia between adjustable stop screws 39 as a function of disc position to be described. The teeth of the segmental gear are engaged by a worm 32 rotatable with a power shaft 33 actuated by hand wheel 34, for instance, or by power means if desired, and which worm shaft 32 is journalled in ears 35 mounted on the plate 28.

For controlling flow through the valve a valve disc 36 is disposed within the valve housing 10, being insertible and removable through the manhole opening 16, with the linkage to be described, and in the preferred form has a bevelled face 37. The valve disc of course is of greater diameter than the valve seat 13 and is preferably ground to seating therewith. As shown in Fig. 5 it is contemplated to use a flat disc and a flat seat if desired. The valve disc for purposes of this discussion may be assumed to have a substantial center 38 at a point which is disposed substantially concentric with the longitudinal axis of the valve housing when the disc sealingly engages the valve seat 13. The valve disc on its rear face is provided preferably with a pair of spaced ears 40 extending perpendicularly of the plane of the disc and disposed symmetrically of the central point 38, and each provided with a pair of relatively registering lever pivot apertures 41 adjacent to the disc, in transverse alignment parallel to the disc, to receive a lever pivot pin 42. The pair of ears 40 preferably are also both provided with a pair of relatively registering link pivot apertures 43, the axis of which is in parallel spaced relation to the axis of the lever pivot pin apertures 41, and is also more remote from the plane of the disc 36. A plane containing the respective axes of apertures 41 and 43 is normal to the plane of disc 36. The link pivot apertures 43 are arranged to receive a link pivot pin 44. The disc-actuating lever comprises preferably a pair of spaced arms 45 having a common hub 46 keyed to the power shaft 24, and at the free end mounted on pivot pin 41. A link 47 is mounted on a pin 48 journalled in a pair of spaced cheeks 50 carried by webs 51 common with and extending substantially diametrically across spider ring 18, and arranged to be straddled by the lever arms 45, as shown in Fig. 2. The free end of the link is connected to the disc ears 40, by the link pivot pin 44.

In order to secure the type of movement desired of the disc in response to power impulses or torque on shaft 24, it is preferred that with the disc in sealing engagement on valve seat 13, the link pivots 48 and 44 will be aligned with the axis of lever torque shaft 24, in a plane parallel to the plane of the disc 36. With the linkage as thus recited, and starting with the full line position shown in Fig. 1, it will be apparent that opening movement of the valve by movement of the disc relative to its seat, will be practically completely axial of the valve, with maintenance of parallel relationship of disc and valve seat as the arc of travel of the axis of pin 42 is so great that for all practical purposes it is practically linear and normal to the plane of the disc. This represents the amount of movement necessary for regulation of the flow and illustratively is a distance as great perhaps as the axial thickness of the bevel shown in the preferred form of the invention. Thereafter, continuation of the opening movement is accompanied by the differential movement arising from the different arcs of travel of the pivot pins 42 and 44 due to their different locations and to the different lengths of the lever and link. In the full open position, as shown in dotted lines in Fig. 1, the pivot pins 42 and 44 have swung so that instead of being aligned with the axis of the valve and with the central point 38 of the vane, they are of course still in alignment with the central point 38 of the disc 36 but are normal to the axis of the valve. It is important to note however that at this point the illustrative central point 38 of the valve disc 36, is still located substantially on the longitudinal axis of the valve. This mid-position of more or less free flow is much better than the positioning of the disc out of the center into a bulge on one side of the valve housing in accordance with prior art efforts to solve the problem, as the frictional effects are a minimum and the linkage required is far simpler.

It will be apparent that with the linkage and the disposition of parts shown, the disc may be moved freely from tightly closed to wide open positions without undue power requirements and with a marked efficiency of open and shut control. Due to the ability to move the disc as a whole substantially axially of the seat while maintaining its parallelism therewith for short distances, it will also be clear that the valve is very efficient for regulation to permit the flows of very small and controlled volumes of fluid and to provide close and exact regulation thereof.

It will be obvious that many changes may be made in the invention without departing from the spirit thereof, and all such are to be construed as within the scope of the appended claims. For instance, as shown in Fig. 5, it is to be observed that the valve disc 52 may have a planar seating face and be seated upon a planar valve seat 53 to avoid any possibility of trouble either from the possibility that pressure on the disc may force it so tightly onto the valve seat as to render its opening difficult or that the same problem might arise from differential expansions due to high temperatures and the like.

I claim as my invention:

1. A valve having a valve seat, a valve disc for seating on the seat, linkage on one side only of the disc for mounting the disc for movement relative to the valve seat, said linkage being arranged to move the disc from a position of parallelism with the valve seat to a position substantially at right angles thereto, said linkage being so arranged that a given central point on the disc is substantially in the center of the valve in both positions of the disc, said linkage comprising a lever mounted at one end on and oscillatable with a shaft having an axis parallel to said disc and offset laterally out of axial alinement therewith when the disc is seated on said seat, means pivotally connecting the other end of said lever to the disc in a given spaced relation thereto, a link shorter than the lever mounted at one end on a pivot fixed relative to the valve seat and also axially out of alinement with the disc when it is seated on said seat, and means pivotally connecting the other end of said link to the disc in a greater spaced relation to the disc than said given spaced relation in order to effect the said movements.

2. A valve having a valve seat, a valve disc for seating on the valve seat, linkage on one side only of the disc for mounting the disc for movement from its seated position to a position substantially at right angles thereto, said linkage comprising a lever and a link having different lengths, an ear on said disc, said lever and link having pivots at their respective disc ends in said ear in spaced relation axially of the disc and with the lever pivoted substantially between the link pivot and said disc.

3. A valve having a valve seat, a valve disc for seating on the valve seat, linkage on one side only of the disc for mounting the disc for movement from seating to a position substantially at right angles thereto, said linkage comprising a lever and a link having different lengths, and each having pivot points at both ends in mutually relatively spaced relation, the lever and link being pivotally attached to the disc by means of an ear extending substantially axially from the disc and in which the pivotal axes of the lever and link are in substantial alignment axially of the disc, with the pivotal axis of the link being further away from the disc than the pivot for the lever.

4. A valve comprising a housing having a valve seat having an axis, a valve disc for seating on the valve seat in parallelism therewith, an ear on the disc extending axially thereof, a lever pivoted to said ear adjacent to the disc and swinging on an axis laterally of the valve on the housing, a link pivoted relative to the housing and having its other end pivoted to the said ear in axially spaced relation to the disc and axially outwardly of the lever pivot thereto, said link and lever mounted on one side only of said disc, said link and lever comprising linkage by which a predetermined disc movement is made during substantial maintenance of the parallelism between disc and seat, while a continuation of the movement is marked by swinging of the disc to a position substantially at right angles to the valve seat.

5. A valve comprising a housing having a valve seat having an axis, a valve disc for seating on the valve seat in parallelism therewith, an ear on the disc extending axially thereof, a lever pivoted to said ear adjacent to the disc and swinging on an axis laterally of the valve on the housing, a link pivoted relative to the housing and having its other end pivoted to the said ear beyond and in axially spaced relation to the disc and the lever pivot thereto, said link and lever comprising linkage by which a predetermined disc movement is made during substantial maintenance of the parallelism between disc and seat, while a continuation of the movement is marked by swinging of the disc to a position substantially at right angles to the valve seat.

6. A valve comprising a housing having a valve seat having an axis, a valve disc for seating on the valve seat in parallelism therewith, an ear on the disc extending axially thereof, a lever pivoted to said ear adjacent to the disc and swinging on an axis laterally of the valve on the housing, a link pivoted relative to the housing and having its other end pivoted to the said ear in axially spaced relation to the disc and axially outwardly of the lever pivot thereto, said link and lever comprising linkage by which a predetermined disc movement is made during substantial maintenance of the parallelism between disc and seat, while a continuation of the movement is marked by swinging of the disc to a position substantially at right angles to the valve seat, the pivotal connection of the link to the housing being by way of a spider having a pivot between the housing pivot for the lever and the link pivot on the housing when the disc is seated.

7. A valve comprising a valve housing, a valve seat formed in the housing, a disc having a sealing face arranged to seat on the valve seat, a rigid ear mounted on the face opposite to the sealing face of the disc extending substantially from the center of the disc, a lever having a pivot point laterally of the valve seat eccentric to the valve housing and pivotally engaging the ear adjacent to said disc, said lever arranged to swing the disc from and toward the valve seat, a link shorter than the lever pivoted to the said ear spaced axially away from the disc and from the lever pivot thereto so that the lever pivot is substantially between the link pivot and said disc, and means for pivoting the other end of the link in a line between the other pivot for the link and the eccentric pivot for the lever with the disc in sealing engagement with the seat, said link arranged to swing the disc about the lever pivot on the ear as the lever swings the disc from the seat.

DAVID W. HOPKINS.

REFERENCES CITED

The following references are of record in the file of this patent:

UNITED STATES PATENTS

| Number | Name | Date |
|---|---|---|
| 593,198 | Currier | Nov. 1897 |
| 1,239,015 | Key | Sept. 4, 1917 |
| 1,381,511 | Smith | June 14, 1921 |

FOREIGN PATENTS

| Number | Country | Date |
|---|---|---|
| 283,782 | Germany | 1915 |
| 418,003 | Great Britain | 1933 |